Feb. 13, 1945.  S. W. WEST  2,369,507
X-RAY APPARATUS
Filed Nov. 20, 1942   5 Sheets-Sheet 1

Feb. 13, 1945.  S. W. WEST  2,369,507
X-RAY APPARATUS
Filed Nov. 20, 1942       5 Sheets-Sheet 3

INVENTOR
Stanley William West
BY
Lee B. Kenow
ATTORNEY

Feb. 13, 1945. S. W. WEST 2,369,507
X-RAY APPARATUS
Filed Nov. 20, 1942 5 Sheets-Sheet 4
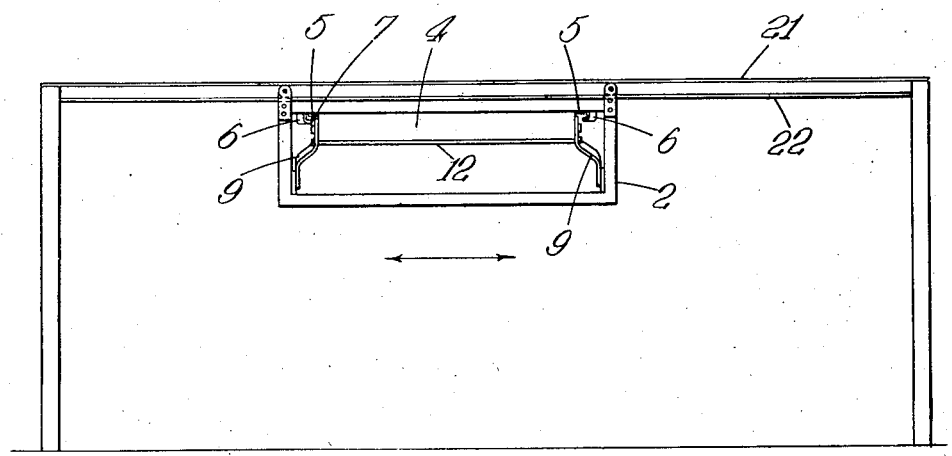
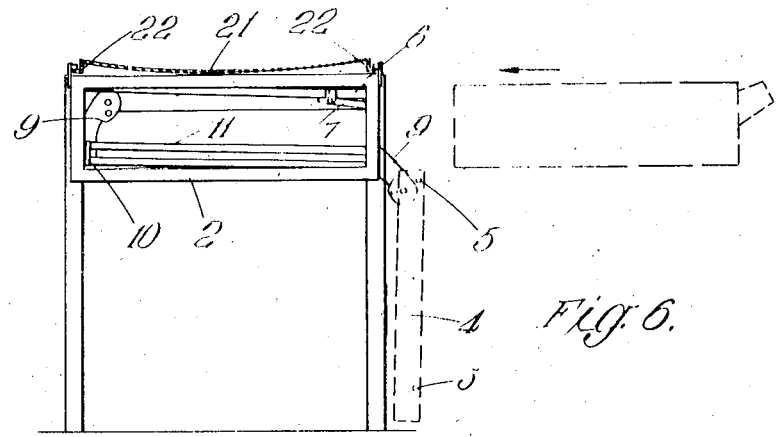
INVENTOR
Stanley William West
By
ATTORNEY

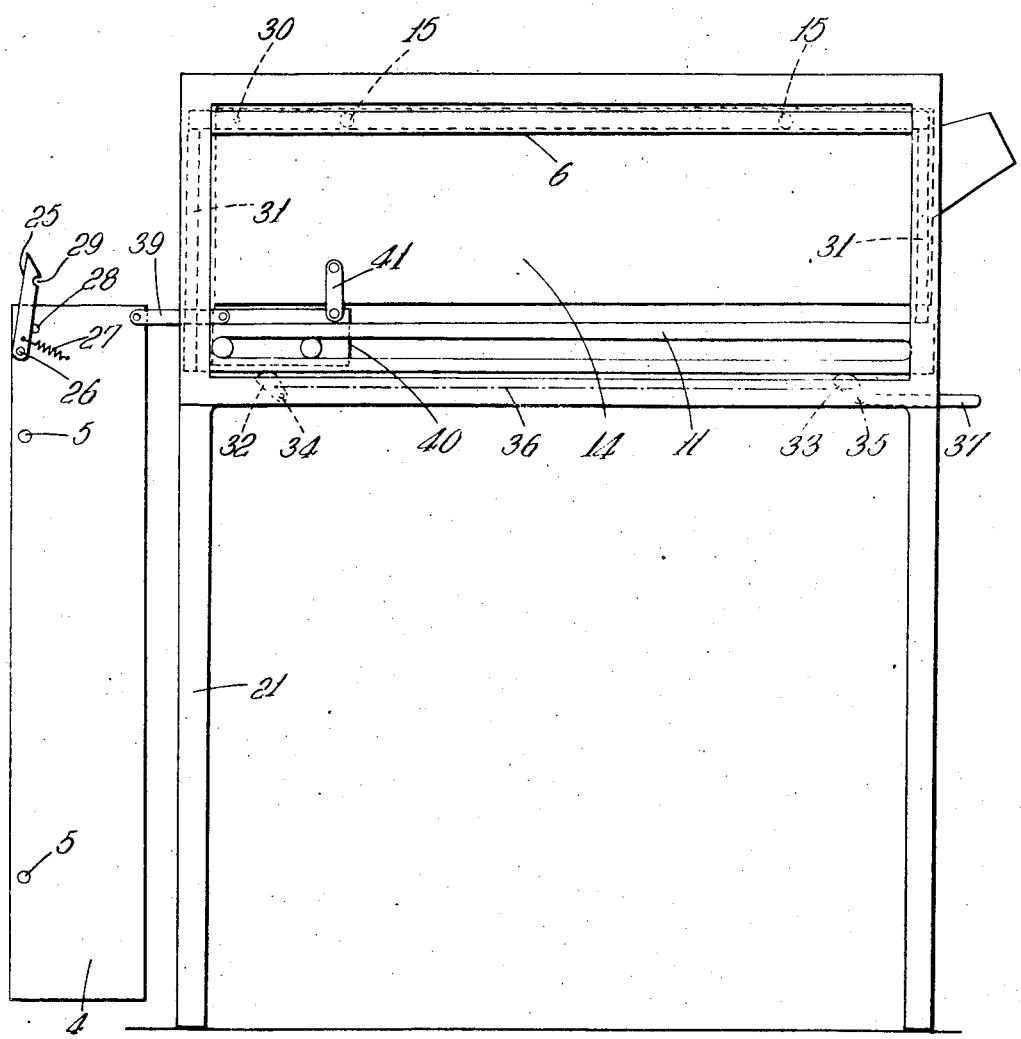

Patented Feb. 13, 1945

2,369,507

UNITED STATES PATENT OFFICE 2,369,507

X-RAY APPARATUS

Stanley William West, Pinner, England, assignor to Hartford National Bank and Trust Company, Hartford, Conn., as trustee Application November 20, 1942, Serial No. 466,337
In Great Britain November 20, 1941

8 Claims. (Cl. 250—58)

The present invention relates to X-ray apparatus and particularly to novel means for maintaining the inspection devices of the apparatus in accurate position relative to the object undergoing X-ray examination.

In X-ray examination it is often necessary to inspect the object to be examined both by means of a fluoroscope and by taking a radiograph thereof.

It is the object of the present invention to enable either or both of the above methods of examination to be carried out simply and quickly.

In accordance with the invention, the photographic cassette, which generally is associated with a Bucky diaphragm, and a fluoroscope are interchangeable and are adapted for alternative mounting in the apparatus with the photographic emulsion and the fluorescent screen respectively in substantially the identical position. In the interests of definition, the photographic cassette is, as is conventional, mounted so that the photographic emulsion is as close as possible to the object. By making the fluoroscope interchangeable with the cassette in the manner defined above, the fluorescent screen likewise occupies a position as close as possible to the object and thus gives a visible image of optimum definition. Also the screen image is in all other respects substantially identical with the photographic image.

The present invention is particularly well adapted for use in X-ray installations in which the tube is disposed above the object, as the cassette and the fluoroscope are then below the couch or surface on which the object is supported and do not impede direct observation of the object or manipulation, surgical operation or the like. The mounting for the cassette carrier or fluoroscope preferably comprises supporting rails sloping upwardly from one side of the couch or the like to the other, with locking means engaging the cassette carrier or fluoroscope to secure it in the operative position and simultaneously to lift it from the lower end of the rails into a substantially horizontal position directly below the surface of the couch.

Figure 1:
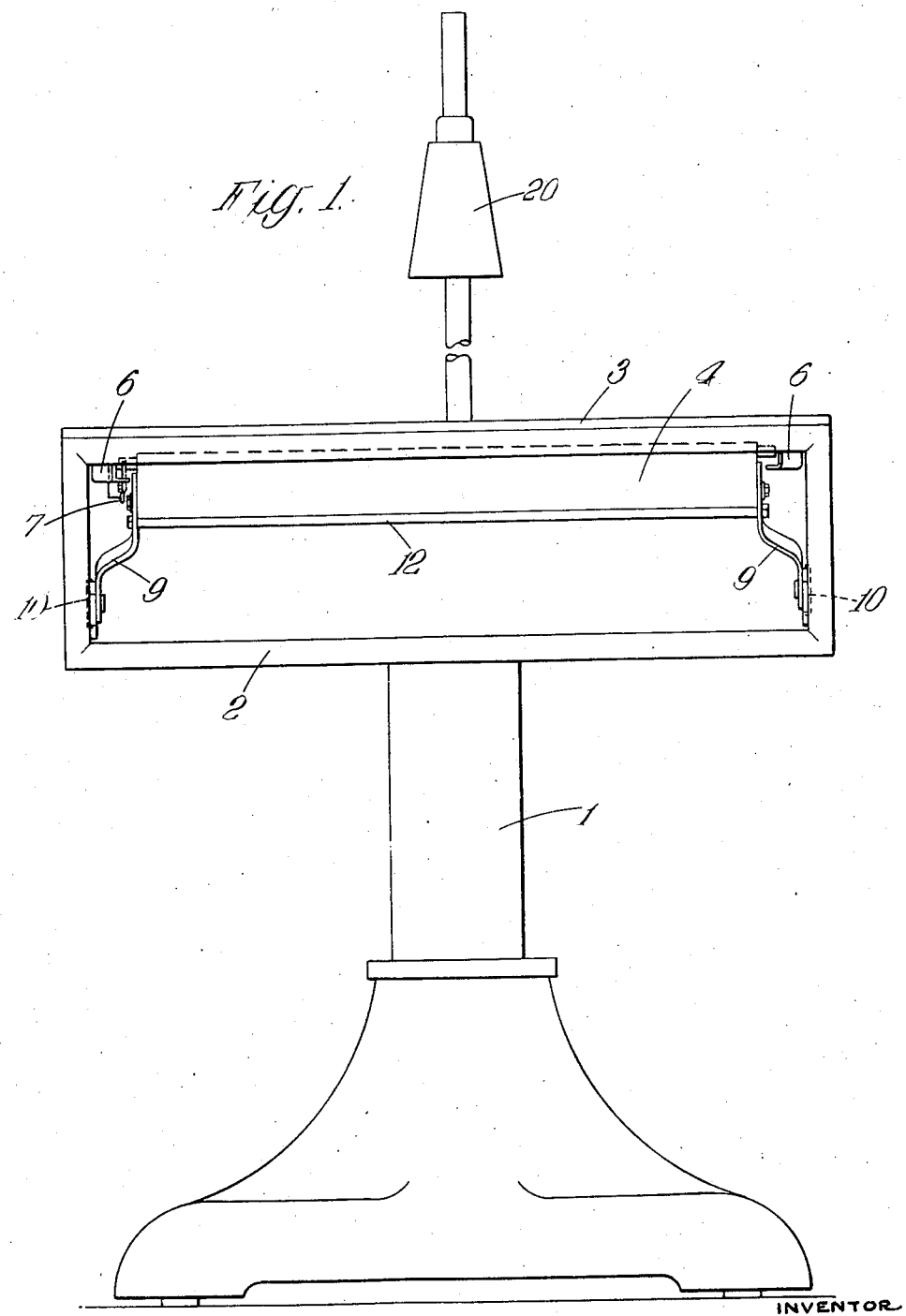
Figure 2:
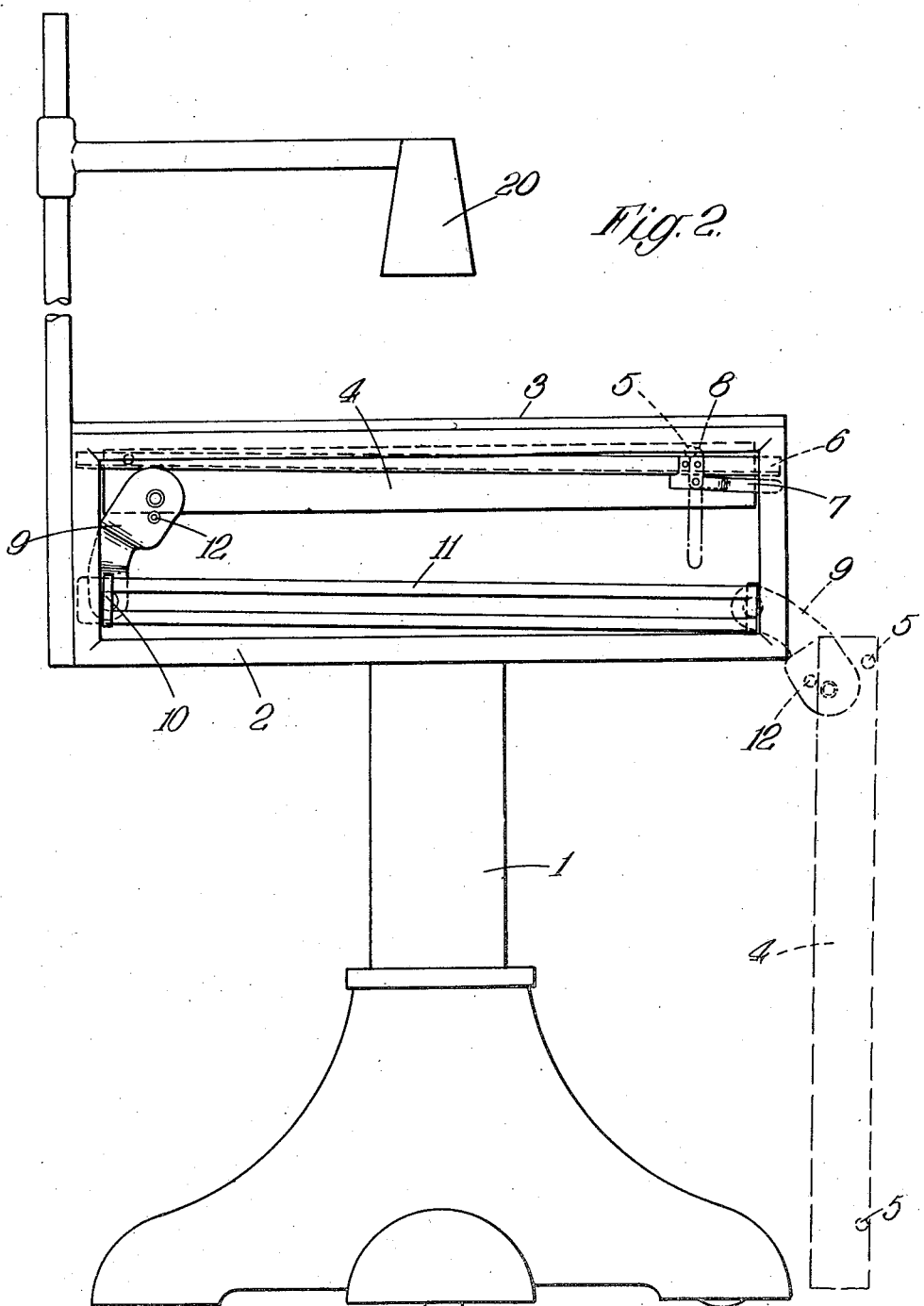
Figure 3:
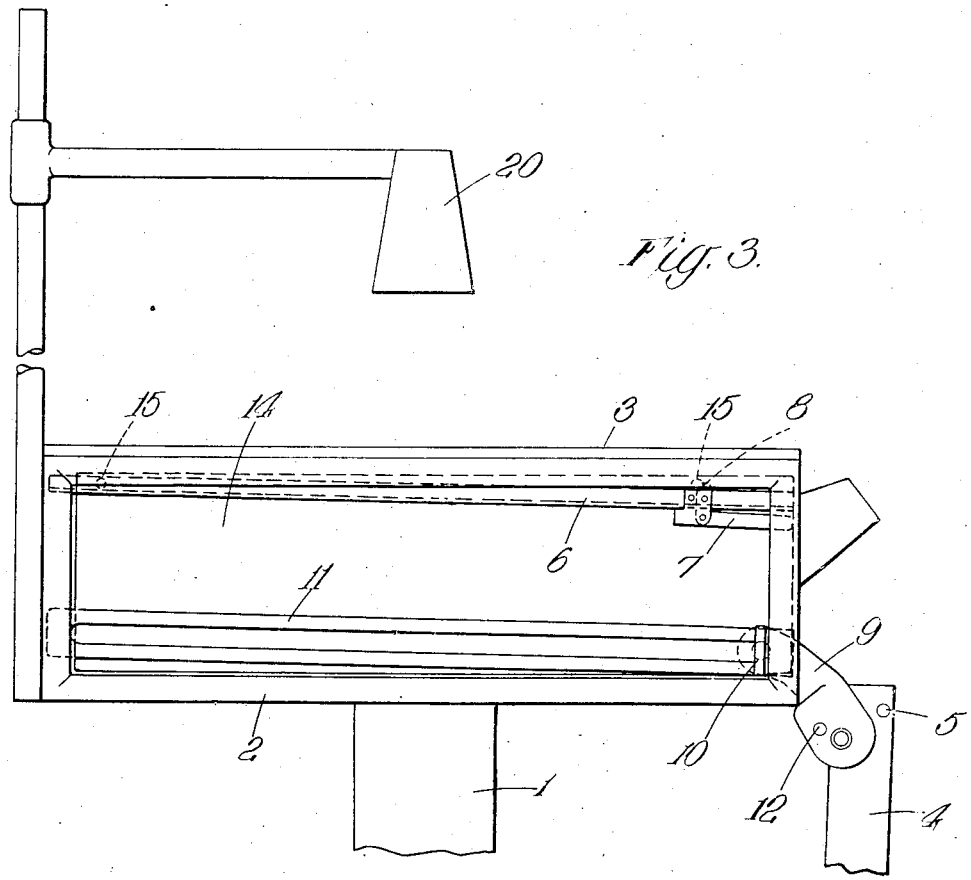
Figure 4:
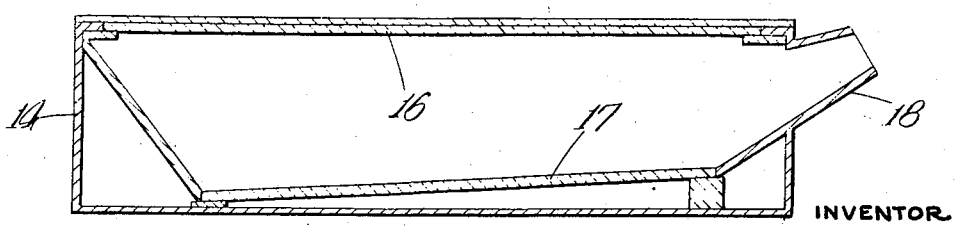

In order that the invention may be more readily understood, reference will now be made to the accompanying semi-diagrammatic drawings, in which Fig. 1 is a side view of an interchangeable photographic unit according to the invention mounted on a pedestal stand, Fig. 2 is an end view of the apparatus of Fig. 1, Fig. 3 is a similar view to Fig. 2 but with the fluoroscope in position, Fig. 4 is a sectional view through the fluoroscope, Fig. 5 is a side view of a second embodiment of the invention, Fig. 6 is an end view corresponding to Fig. 5, Fig. 7 is a view similar to Fig. 6, showing a further embodiment of the invention.

Referring first to Figs. 1 to 3, an adjustable pedestal 1 carries a rigid framework 2 provided with a cover plate 3 of material which is substantially transparent to X-rays. The cassette carrier 4, which is associated in customary manner with a Bucky diaphragm, is provided on opposite sides with rollers 5 which run on rails 6 secured to the framework 2. As clearly shown in Figs. 2 and 3, the rails 6 slope downwardly towards one side of the framework 2. In order that the cassette carrier 4 can be secured in the operative position substantially parallel to the surface of the cover plate 3, one of the rollers 5 on the cassette carrier 4 is engaged by a locking lever 7 provided with a latch 8 whereby the end of the cassette carrier 4 at the lower end of the rails 6 is lifted from these rails when the lever 7 is moved into the locking position (Fig. 3 and full-line position Fig. 2). A lever 7 may be provided on each of the rails 6 instead of on one rail 6 only as shown in Fig. 1.

In order that the cassette carrier 4 can be permanently associated with the framework, links 9 are provided which are pivotally attached to the cassette carrier 4 at the top and at the lower end and are each attached to a carriage 10. The carriages 10 are slidable on rails 11 extending parallel to the rails 6. The two links 9 are connected by a rod 12 extending close to the bottom of the cassette carrier. After releasing the locking lever (or levers) 7 thereby lowering the cassette carrier 4 so as to be supported at both ends on the rails 6, the cassette carrier 4 can be withdrawn, the links 9 and the carriages 10 following the movement until all the rollers 5 are clear of the rails 6 and the carriages 10 are at the lower ends of the rails 11. The cassette carrier 4 can then be lowered with simultaneous pivotation of the links 9 until movement of the links 9 is arrested by abutment against the framework 2. The cassette carrier 4 then hangs freely from the links 9, leaving free the access to the rails 6 and the space occupied by the cassette carrier when in its operative position. The fluoroscope 14 can then be introduced into this space. For this purpose, the fluoroscope housing is provided with rollers 15 corresponding to the rollers 5 on the cassette carrier 4 and also adapted for engagement with the rails 6. The fluoroscope 14 is secured in position and raised into parallelism with the cover plate 5 by means of the locking lever (or levers) 7 in identically the same manner as described above for the cassette carrier.

As best seen from Fig. 4, the fluoroscope 14 comprises a fluorescent screen 16 positioned for observation from below, a substantially light-tight housing, an inclined mirror 17 in the lower part of the housing and a visor 18. The mirror is of such length and inclined at such an angle that the whole of the screen 16 can be observed from the visor 18 by reflection in the mirror 17. The inner surfaces of the visor 18 as well as a surface 19 extending from the lower end of the mirror 17 to the adjacent edge of the screen 16 are preferably made dull black so as to avoid any distraction of the observer. Similar provision for preventing distraction may be made on either side of the visor 18 at the end of the mirror 17 adjacent the visor. The operator can consequently view the subject by direct visual observation and view the X-ray image on the screen with a minimum of movement. Since the housing is light tight it is not essential for satisfactory viewing of the screen image to adopt the customary expedient of completely darkening the room. As the cassette carrier 4 and the fluoroscope 14 are carried by the same supports (rails 6 and lever 7), the photographic film and the fluorescent screen can occupy identical positions so that identification of a detail to be photographed can be carried out with the fluoroscope under conditions precisely the same as those which will obtain for photography.

Due to the means provided for supporting the cassette carrier 4 in the inoperative position (Fig. 3 and broken lines in Fig. 2), the cassette carrier can rapidly be replaced in the operative position after the fluoroscope 14 has been removed. On grasping the cassette carrier 4 and raising it by swinging it forwardly and upwardly, pivotation occurs about the carriages 10 due to the underside of the cassette carrier bearing against the rod 12. By this pivotation, the rollers 5 are brought into position for introduction into the rails 6. The cassette carrier is then simply pushed home and lifted and locked by the lever (or levers) 7.

Such an arrangement as described with reference to Figs. 1 to 3 may constitute an accessory for use with a separate X-ray tube and a separate couch or table of a suitable height to enable the accessory to be introduced immediately beneath it. This enables a subject to be examined on the screen and/or photographed without being transferred to a special X-ray couch. Alternatively, the arrangement may be such that the cover plate 3 constitutes the couch or table, wholly or in part. In this case the X-ray tube 20 may be directly associated with the framework 2 as indicated in Figs. 1 to 3.

Instead of the interchangeable cassette carrier and fluoroscope being carried in a fixed framework as previously described, the framework may constitute a rigid carriage mounted to travel on rails beneath an X-ray couch. Such an arrangement will now be described with reference to Figs. 5 and 6 in which components equivalent to those described with reference to Figs. 1 to 4 are indicated by the same numerals as in those figures.

The couch or table 21 of conventional design is provided with longitudinal rails 22 on which a rigid carriage in the form of a framework 2 can slide. The cassette carrier 4 is supported by rollers 5 on rails 6 extending transversely of the couch on the framework 2. It is locked in position by a lever (or levers) 7 and is provided with links 9 associated with carriages 10 on rails 11. By means of these links 9 the cassette carrier 4 can be suspended in the inoperative position shown in broken lines. The interchange of cassette carrier 4 and fluoroscope 14 is effected precisely as described with reference to Figs. 1 to 3, so that no further explanation is necessary for the understanding of Figs. 5 and 6.

Instead of employing inclined rails 6 and lifting the lower end of the cassette carrier 4 or fluoroscope 14 by the locking lever or levers 7, the rails 6 could be horizontal and the locking action could then produce bodily movement of the entire cassette carrier or fluoroscope to bring the desired apparatus into closest possible relation to the subject under X-ray examination.

More particularly in this last-mentioned modification and especially in its application to the embodiment of Figs. 5 and 6, the fluoroscope could be attached to the cassette carrier so that on drawing the cassette carrier out into the inoperative position, the fluoroscope is automatically drawn into position. To avoid undue projection beyond the couch when the fluoroscope is not in use, it could be pivotally attached to the cassette carrier, so as to hang vertically therefrom. A latch connection could then be provided to hold the cassettte carrier and fluoroscope in horizontal alignment during the interchange movement, the latch being released to enable the component out of use to be pivoted downwardly to hang close to the side of the couch, as shown in the case of the cassette carrier in broken lines in Fig. 6.

Such a modification is shown in Fig. 7 wherein the rails 6, 11 are united by end members 31 to form an open frame unit which is movable towards and away from the couch top by means of the cams 32, 33 pivoted to the couch frame at 34, 35 and joined by a link 36 to enable simultaneous actuation by a lever 37. The position shown is the viewing position. When it is desired to interchange the fluoroscope 14 and the cassette carrier 4 (which includes the Bucky diaphragm) the lever 37 is depressed to lower the rails to ensure there is no interference between the underside of the couch and the fluoroscope (or cassette carrier) during the interchange movement.

The cassette carrier 4 which has rollers 5 to run on the rails 6 is pivotally connected by a link 39 with a carriage 40 slidable on the rails 11. The fluoroscope 14 is likewise pivotally connected to the carriage 40 by a link 41. To effect the interchange, the cassette carrier 4 is caused to pivot about the carriage 40 until its upper surface is in alignment with the top of the fluoroscope 14. In this position a latch 25 provided with a recess 29 engages a pin 30 on the fluoroscope to hold the two together in a readily releasable manner. The latch 25 is pivoted to the cassette carrier 4 at 26 and is subjected to the action of a spring 27 which, when the cassette carrier 4 is released from the fluoroscope 14, urges the latch 25 against a stop 28 arresting the latch 25 in a position facilitating re-engagement with the pin 30.

When the fluoroscope 14 and the cassette carrier 4 are latched together in horizontal alignment, they can readily be displaced along the rails 6 so as to bring either into the operative position beneath the couch top. The rails 6, 11 are then lifted by operating the lever 37 to bring the fluorescent screen or photographic plate as close as possible to the underside of the couch top. On releasing the latch, the pivotal link connection with the carriage 40 enables that component which is not in use to hang adjacent the side of the couch. In so far as the components of Fig. 7 correspond with those of the previous figures they are indicated by the same reference numerals and are not fully described with reference to Fig. 7.

While I have described my invention by means of specific examples and in specific embodiments, I do not wish to be limited thereto for obvious modifications will occur to those skilled in the art without departing from the spirit and scope of the invention.

I claim:

1. An apparatus for radioscopically and radiographically inspecting an object by means of X-rays, comprising a fluoroscope, a photographic cassette carrier, and means for selectively holding the fluoroscope and said carrier in identical position with respect to the object to be inspected, said means comprising two spaced frame members and rail members secured to said frame members, means secured to said cassette carrier for engaging said rail members, and means pivotally and slidably securing said carrier to said frame members.

2. An apparatus for radioscopically and radiograpically inspecting an object by means of X-rays, comprising a fluoroscope, a photographic cassette carrier and means for selectively holding the fluoroscope and said carrier in identical position with respect to the object to be inspected, said means comprising two spaced frame members, rail members and guide members secured to said frames, means secured to said carrier engaging said rail members and positioning the carrier between the frame members and link members secured to said carrier, said link member pivotally and slidably engaging said guide members and supporting said carrier in a hanging position when the carrier is withdrawn from between the frame members.

3. An apparatus for radioscopically and radiographically inspecting an object by means of X-rays, comprising a supporting surface for the object to be inspected, a fluoroscope, a photographic cassette carrier and means for selectively holding the fluoroscope and said carrier in identical position with respect to the object to be inspected, said means comprising two spaced frame members a plurality of rail members one secured to each of said frame members and extending in an inclined direction with respect to said supporting surface, means secured to said carrier for engaging said rail members and positioning the carrier between the frame members and means to elevate one end of said carrier from said rail members and to place the same in operative position with respect to said supporting surface.

4. An apparatus for radioscopically and radiographically inspecting an object by means of X-rays, comprising a fluoroscope and a photographic cassette carrier and means for selectively holding the fluoroscope and said carrier in identical position with respect to the object to be inspected, said means comprising two spaced frame members, a plurality of rail members one secured to each of said frame members, means secured to said carrier for engaging said rail members and for placing said carrier in position with respect to the object to be observed, said fluoroscope comprising a substantially light-tight enclosure having visor within one wall thereof, a fluorescent screen in a second wall of said enclosure and a mirror within said enclosure for reflecting light from said screen through said visor.

5. An apparatus for radioscopically and radiographically inspecting an object by means of X-rays, comprising a table member for supporting the object to be inspected, two spaced substantially parallel frame members secured to and extending from said platform, a plurality of substantially parallel rail members one secured to each of said frame members and each inclined with respect to said platform, a plurality of substantially parallel guide members one secured to each of said frame members and each substantially parallel to said rail members, a fluoroscope, a photographic cassette carrier, means secured to said carrier for engaging said rail members, link members pivotally secured to said carrier engaging said guide members, said link members serving to suspend said carrier in a vertical position from said frame members when said carrier is withdrawn from its operative position, means secured to said fluoroscope for engaging said rail members, and means to elevate the inclined end of said carrier and the fluoroscope to bring and lock the same in operative position with respect to the supporting platform.

6. An apparatus for radioscopically and radiographically inspecting an object by means of X-rays, comprising a table member for supporting the object to be inspected, rail members secured to said table and extending lengthwise thereof, a carriage member slidable on said rail members and comprising two spaced and substantially parallel frame members, a plurality of parallel rail members one secured to each of said frame members a plurality of substantially parallel guide members one secured to each of said frame members and each substantially parallel to said second rail members, a fluoroscope, a photographic cassette carrier, means secured to said carrier for engaging said second rail members, link members pivotally secured to said carrier engaging said guide members, said link members serving to suspend said carrier in a vertical position from said carriage when said carrier is withdrawn from its operative position, and means secured to said fluoroscope for engaging said second rail members.

7. An apparatus for radioscopically and radiographically inspecting an object by means of X-rays, comprising a fluoroscope, a photographic cassette carrier, and means for selectively holding the fluoroscope and said carrier in identical position with respect to the object to be inspected, said means comprising two spaced frame members and rail members secured to said frame members, a carriage slidably engaging said rail members, and means pivotally securing said fluoroscope and said cassette members to said carriage whereby engagement of said rails by either one of said last-named members causes the other to assume a position at right angles to said frame members.

8. An apparatus for radioscopically and radiographically inspecting an object by means of X-rays, comprising a fluoroscope, a photographic cassette carrier, and means for selectively holding the fluoroscope and said carrier in identical position with respect to the object to be inspected, said means comprising two spaced frame members and rail members secured to said frame members, a carriage slidably engaging said rail members, means pivotally securing said fluoroscope and said cassette members to said carriage whereby engagement of said rails by either one of said last-named members causes the other to assume a position at right angles to said frame members, and means for temporarily aligning and coupling said fluoroscope with said cassette carrier for joint travel along said rails.

STANLEY WILLIAM WEST.